April 8, 1947.                W. S. AUSHERMAN                2,418,567
                    TRAILER FOR SELF-PROPELLED COMBINES
                    Filed Feb. 9, 1946            3 Sheets-Sheet 1
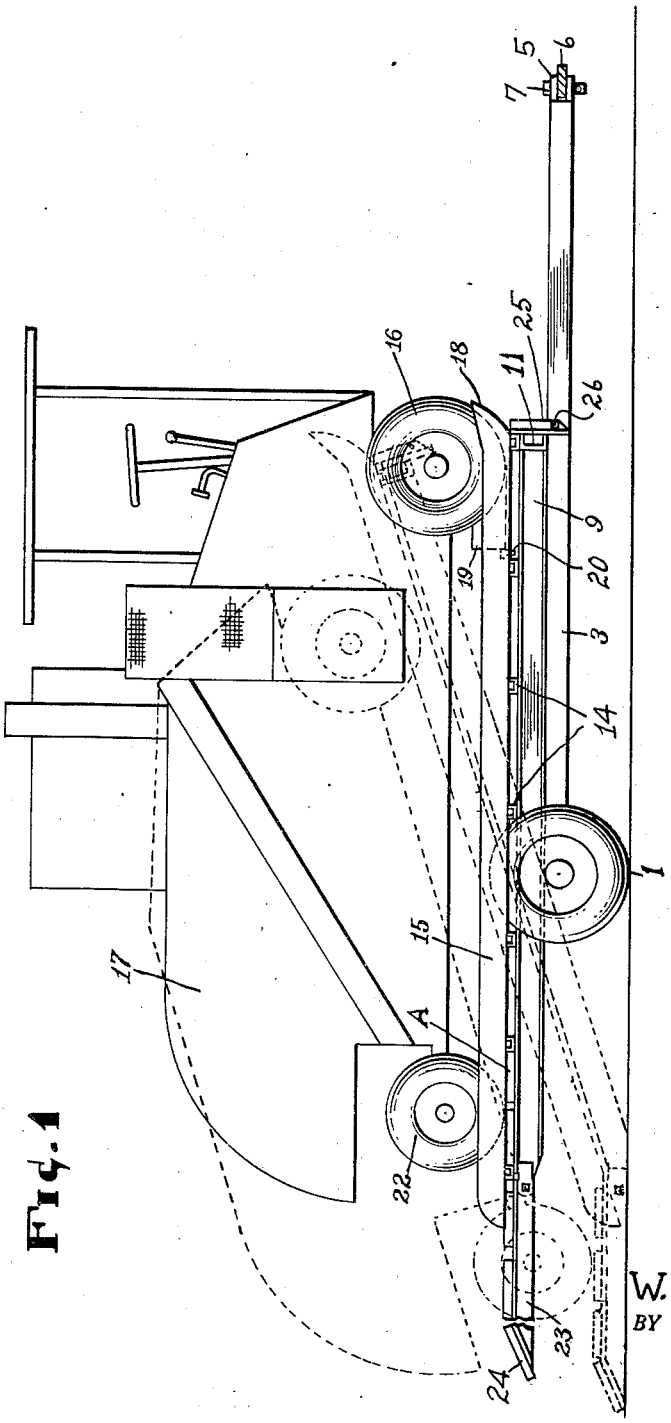
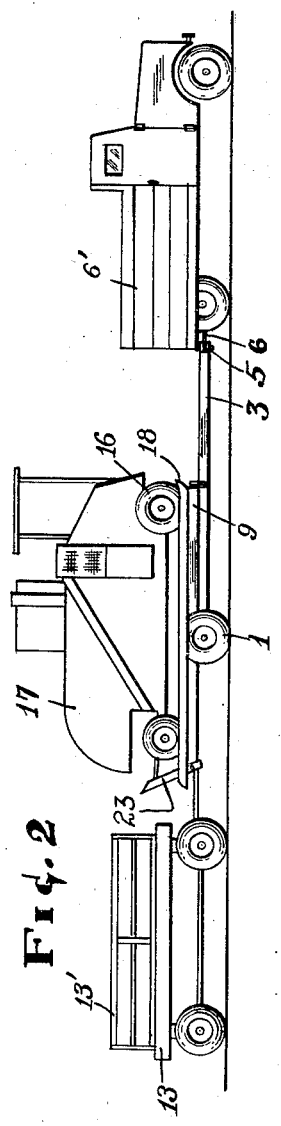
INVENTOR.
W. S. AUSHERMAN.
BY April 8, 1947.   W. S. AUSHERMAN   2,418,567
TRAILER FOR SELF-PROPELLED COMBINES
Filed Feb. 9, 1946   3 Sheets-Sheet 2
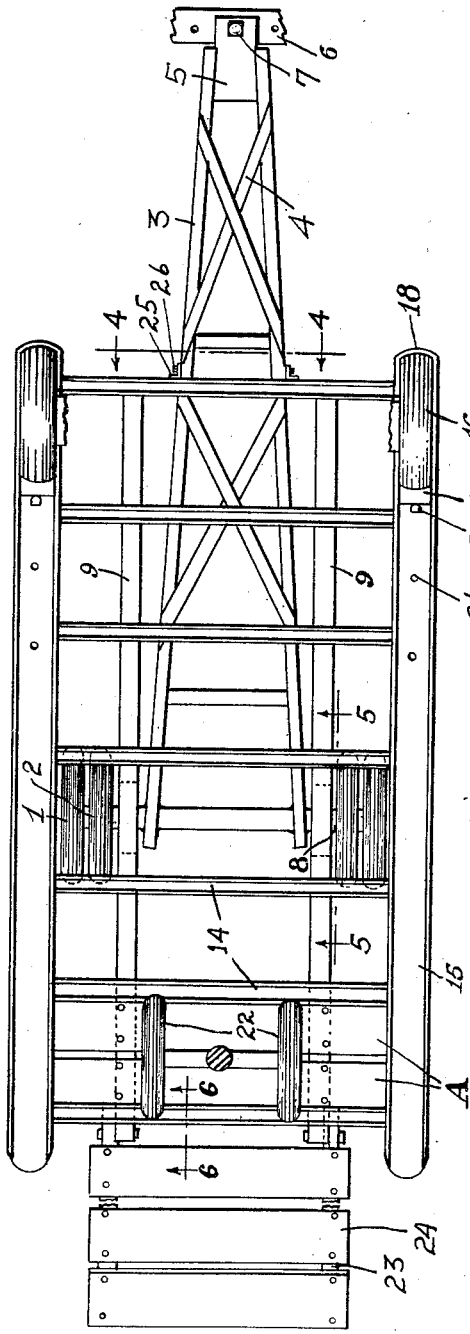
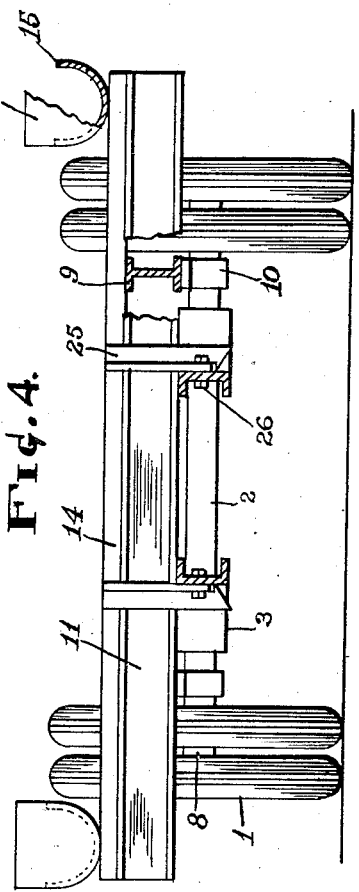
INVENTOR.
W. S. AUSHERMAN.

April 8, 1947.  W. S. AUSHERMAN  2,418,567
TRAILER FOR SELF-PROPELLED COMBINES
Filed Feb. 9, 1946  3 Sheets-Sheet 3
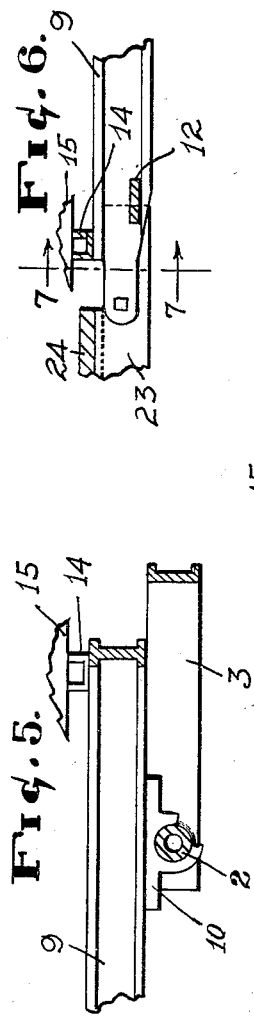
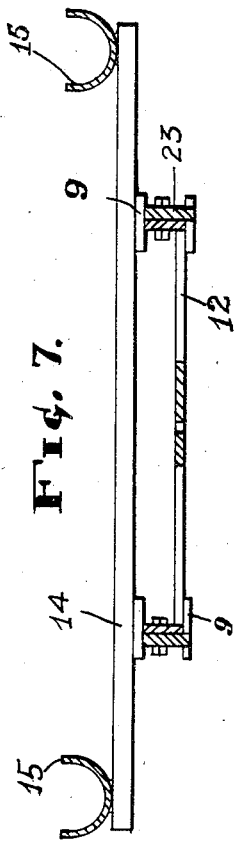
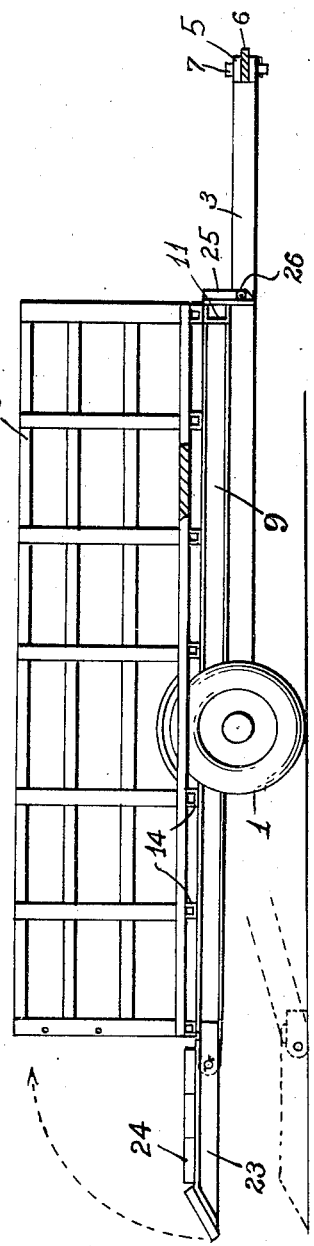
INVENTOR.
W. S. AUSHERMAN.

Patented Apr. 8, 1947

2,418,567

UNITED STATES PATENT OFFICE 2,418,567

TRAILER FOR SELF-PROPELLED COMBINES

William S. Ausherman, Wichita, Kans.

Application February 9, 1946, Serial No. 646,673

3 Claims. (Cl. 214—85)

1

This invention relates to a trailer for self-propelled combines, and has for its principal object a trailer arrangement whereby a self-propelled combine can easily approach and load itself on the trailer.

A further object of this invention is to construct the trailer in such a way as to eliminate the use of a winch as well as power to actuate the same.

A still further object of this invention is to provide tracks for the front wheels of the combine that are semi-circular in cross section, and an approach to be surmounted by the rear or guiding wheels that are in close relation, the approach being rockably carried and rule-back jointed to rock the same on an arc to a desired position.

A still further object of this invention is to construct a rockable platform for the trailer whereby the approach may break to a horizontal plane until the combine has crossed the rocking point of the platform, and at the same time the rear wheels will be positioned on the rockable approach so that a counterbalance action will erect the rear or guiding wheels on the same horizontal plane with the front or traction wheels, the structure of the trailer having an elongated tongue connected to the hitch of a truck, or the like.

A still further object of this invention is to construct a trailer whose traction is substantially the same to that of the truck with respect to the wheels, while the semi-circular tracks for the combines are vertically aligned with the outer sides of the wheels of the trailer, whereby the wheels of the combine are not restricted for traction on the slab as the same are carried thereabove by the trailer and may overextend the edge of the slab at times during transit, and furthermore being so arranged will not obstruct highway traffic under normal driving.

These and other objects will hereinafter be more fully explained, reference being had to the accompanying drawings forming a part of this specification, and in which like characters will apply to like parts in the different views.

Referring to the drawings:

Fig. 1 is a side view of the trailer and method of loading the combine.

Fig. 2 is a side view of a truck, and trailers carrying their respective parts of the combine.

Fig. 3 is a plan view of the trailer and position of the front and rear wheels of a combine.

Fig. 4 is an enlarged sectional view taken on line 4—4 in Fig. 3.

2

Fig. 5 is an enlarged sectional view taken on line 5—5 in Fig. 3.

Fig. 6 is an enlarged sectional view taken on line 6—6 in Fig. 3.

Fig. 7 is an enlarged sectional view taken on line 7—7 in Fig. 6.

Fig. 8 is a side view of the invention having a rack positioned thereon.

As a more concised description of the drawings, it will be seen in Fig. 1 that a trailer is mounted on one pair of dual wheels 1, said wheels being journalled on a suitable axle 2 to carry the load, said wheels having a tongue comprising a pair of channels 3 spaced apart, the channels being diagonally braced by bar elements 4 and connected in such a way as to position the channels convergently forward, the forward ends of said channels being connected by a pair of plates 5 in spaced relation vertically and welded to the channels. The forward extremity of said plates extend forward from the channels and are adapted to straddle the drawbar 6 of a truck 6', or the like, and pivotedly connected thereto by a king pin 7 extending through said plates and bar. Being so connected will permit turning in transit and restrict a lateral rocking movement at any instance to avoid upsetting of the load imposed on the trailer as the same may be top heavy.

It will be seen that the rear ends of the channels are rigidly secured to the axle structure a spaced distance inward from their respective dual wheels, as said axle is not rotatable but having on its outer ends conventional spindles 8 on which the dual wheels are journalled. The said channels and diagonally bracing members as assembled will function as a tongue to hitch the trailer to a truck, or the like, in the manner above described.

The platform of the trailer consists of a pair of I-beams 9 that rest on the axle of the wheels and rockably connected thereto by bearings 10 as shown in Fig. 5, the major length of which forwardly extends to counterbalance a load carried thereby to rock the beams to a horizontal plane for the purpose later described.

The said I-beams are positioned on the innerside of the dual wheels but spaced therefrom for clearance of rotation. The forward ends of the I-beams are secured by a channel bar member 11, the ends of which extend outward from the beams to an entire width for the platform, while the rear ends of the I-beams are secured together by a flat bar 12 lying on the upper sides of the channels lower legs to further function as a hitch for another trailer 13, which trailer may carry parts detached from the combine, such parts being a reel and straw receiving platform 13' as shown in Fig. 2.

Secured transversely to the upper portion of the I-beams is a plurality of channel bars 14 in spaced relation from one end to the other of said I-beams and rockable therewith, said channels being equal in length to that of bar 11 but on a higher plane to function as carrying means for semi-circular tracks 15 adjacent the ends of the channels, and in said tracks the traction wheels 16 of a self-propelled combine 17 will engage and be guided at the time of loading the same on the platform. It will also be seen that the forward end of the tracks are closed by a member 18 and extending thereabove to function as a stop for the combine when the wheels 16 are moved in contact therewith, and to secure the wheels against retraction there is provided a movable stop 19, the confronting portion with respect to the wheel is arcuate corresponding to that of the wheel, said stops being secured against movement by a pin 20 engaging through apertures 21 selectively, that are spaced along the track, the upper ends of the pins being headed to extend upward and against which the stop element will engage to hold the combine from moving rearward during transit but removed for unloading the combine when rocked to a position as shown in Fig. 1.

It will be understood that the said tracks are secured to each cross bar 14 to avoid lateral rocking movement at the time of making a turn during transit. Furthermore it will be understood that the tracks above described are to receive the front traction wheels of the combine, while the rear wheels 22 will engage on an approach, the free end of which seats on the ground with the other end is rockably connected to the rear end of the beams. The approach comprises a pair of L-shaped bars 23 of suitable length to engage on the ground when the said platform is rocked from a horizontal plane for loading and unloading the combine, said L-shaped members being floored with heavy planks 24 and further planks a spaced distance inward of the approach at A, and on which the rear wheels of the combine will engage. The connection of the L-shaped members are adjacent the rear ends of the platform, the connection being so arranged that the approach will rock one way only as the ends of the L-shaped members inward of the pivotal joint will engage with the underside of the upper legs of the I-beams but free to rock the other way to a desired angle or at a right angle to said I-beams, said approach being rockably connected to swing in an upward direction only to avoid the necessity of red flagging the same as such extension will come within the traffic law with respect to danger notice. Furthermore it is more convenient when rocked upward to attach another trailer hitch as heretofore described.

Secured to the forward ends of the platform is a pair of vertically positioned bars 25 L-shaped in cross section, the lower ends of which are cut at an angle slanting outward from each other as a guide to equalize the position of the platform over the tongue, and furthermore where the members engage on each side of the tongue, one leg of each is drilled to receive a bolt 26 therethrough and through said tongue channels, whereby the platform is secured rigid against rocking movement and upon removing the bolts, the platform is free to rock upward to position its rear end in close proximity to the ground so that its approach will lay flat thereon for the purpose of loading the combine.

In loading the combine, it will be understood that its traction wheels will engage in the semi-circular tracks and as they approach the front, the rear guiding wheels will surmount the rockable approach prior to the time the combine passes its counterbalance point on the platform, at which instant a first rocking movement takes place as the platform and approach are moved to an alignment with each other, and by a further movement of the combine the balance point is crossed which in turn produces a counterbalance to rock the platform on a horizontal plane automatically, after which the combine will move forward to engagement with the stops in the tracks, while the guide wheels in response to the movement will leave the approach, at which time, said approach may be rocked upward to a desired slant or vertically positioned and suitably secured by cables, or otherwise. To unload the combine the anchor bolts are removed and the approach released to rock downward on a plane with the platform and by backing the combine, the platform and approach will automatically take their slanting position to permit an unobstructed movement to the ground.

Fig. 8 is a modification illustrating a trailer as having a rack 28 carried by the platform for general hauling, while the approach may serve as an end gate, likewise modified to close the end, and as a convenient means to unload from the rear of the rack, and in some instances, the rocking movement is a convenience for sliding the load rearward and outward while the truck and trailer is moved forward, and such other modifications may be made as lie within the scope of the appended claims.

I claim:

1. In a trailer for self-propelled combines comprising an axle, a pair of dual wheels journalled on each end of the axle, a platform comprised of a pair of longitudinal I-beams, said I-beams being adjacent the innerside of their respective pair of dual wheels, a bearing rockably mounted on the axle to carry each I-beam intermediate the ends of the I-beams, channel bars transversely crossing and secured to the I-beams in spaced relation longitudinally of the I-beams to carry a pair of semi-circular tracks adjacent their oppositely disposed ends and being secured thereto, said tracks being vertically aligned with the outer sides of said dual wheels, a tongue having one end secured to the axle and means to pivotedly secure the other end to a hitch of a truck, a pair of vertically positioned bars carried by one end of the platform to straddle the tongue, bolts to secure said bars to the tongue to avoid rocking movement of the platform, and an approach rockably secured to the other end of the platform in such a way as to maintain an alignment therewith and adapted to rock upward from the aligned position.

2. In a trailer for self-propelled combines, as recited in claim 6, the tongue comprising a pair of channels convergently positioned longitudinally and being diagonally braced in spaced relation therealong, the divergent end of the tongue being secured to the axle, a pair of plates for the convergent end of the tongue, said plates conforming to the convergence of the channels in spaced relation from each other, said plates outwardly extending from the ends of said channels to function as a hitch and being bored adjacent their outer ends, said approach comprised of a pair of L-shaped beams having one pair of their corresponding ends rockably connected to the web of the I-beams intermediate their upper and lower legs, said I-beams for a spaced distance longitudinally inward from the pivot connection of the approach having a portion of their oppositely extending lower legs removed so that the ends of the L-shaped beams from the pivot points toward the platform is free to permit rocking movement of the approach vertically without obstruction while the upper legs of said I-beams will function as a stop to avoid rocking movement of the approach in the other direction, said L-shaped beams being floored with planks to carry the rear wheels of a combine on their path to the platform, and likewise the platform for a comparatively short distance from its rear end toward the forward end being floored while the remaining portion of the platform being open with respect to a floor.

3. In a trailer for self-propelled combines comprising an axle and dual wheels journalled on each end of said axle, said axle being equal in length to that of an axle of a conventional trucking vehicle so that the said dual wheels will follow the path of the trucking vehicle's wheels, a rockable frame mounted on the axle, said frame comprising a pair of longitudinal I-beams, said I-beams being positioned adjacent the inner side of their respective dual wheels, a pair of bearings mounted on the axle to carry the I-beams intermediately of their ends, said rockable frame further comprising a plurality of cross channel bars secured to the I-beams in spaced relation therealong, a longitudinal track secured on the outer corresponding ends of the channels and being positioned outwardly and above said dual wheels, a tongue comprising a pair of channel members, one end of said tongue being rigidly secured to the axle inwardly from the I-beams, and from thence converging and extending beyond one end of the frame, a rockable approach carried by the other end of the frame, said approach being adaptable to rock upwardly from a straight alignment with the frame and being restricted from downward rock from said alignment, said approach being less in width than the frame to position between the tracks, said approach to receive rear guiding wheels of a self-propelled combine while the longitudinal tracks receives traction wheels of said combine, said combine in its loading operation will first rock the first said end of the frame downwardly to align with the approach and on a further movement of the combine the frame and its approach will be rocked to parallelism with the tongue, and L-shaped bars carried by the first said end of the frame to straddle the tongue, and bolts to secure the bars to said tongue to avoid rocking movement of said frame.

WILLIAM S. AUSHERMAN.

REFERENCES CITED

The following references are of record in the file of this patent:

UNITED STATES PATENTS

| Number | Name | Date |
| --- | --- | --- |
| 1,280,141 | Bonner | Oct. 1, 1918 |
| 1,352,898 | Houck | Sept. 14, 1920 |
| 1,870,573 | Kuchar | Aug. 9, 1932 |
| 2,188,374 | Sanchez | June 30, 1940 |
| 2,405,299 | Godwin | Aug. 6, 1946 |

FOREIGN PATENTS

| Number | Country | Date |
| --- | --- | --- |
| 571,803 | French | Feb. 8, 1924 |